United States Patent [19]

Weinert

[11] Patent Number: 4,553,394

[45] Date of Patent: Nov. 19, 1985

[54] SPINDLE DRIVE WITH EXPANSIBLE CHAMBER MOTORS

[76] Inventor: Friedrich Weinert, 219-19-131st. Ave, Jamaica, N.Y. 11413

[21] Appl. No.: 485,486

[22] Filed: Apr. 15, 1983

[51] Int. Cl.[4] ............................................... F03G 7/06
[52] U.S. Cl. ...................................... 60/530; 60/528; 60/721
[58] Field of Search .......................... 60/530, 531, 528

[56] References Cited

U.S. PATENT DOCUMENTS 3,016,691 1/1962 Asakawa et al. ...................... 60/528
3,183,720 5/1965 Baker .................................... 60/530

Primary Examiner—Allen M. Ostrager
Attorney, Agent, or Firm—James P. Malone

[57] ABSTRACT

Spindle drive for a power shaft. A pawl is mounted on the spindle, the spindle being connected to be rotated by stroke action of the pawl. An expansible chamber motor is connected to the pawl to rotate the spindle. The expansible chamber motor contains two different fluids. An electrical resistance wire passes through one of the fluids. A source of electricity is connected to the wire whereby the fluid becomes energized by the electrical resistance wire and thermo expansion inside the motor will rotate the spindle to do physical work.

7 Claims, 6 Drawing Figures

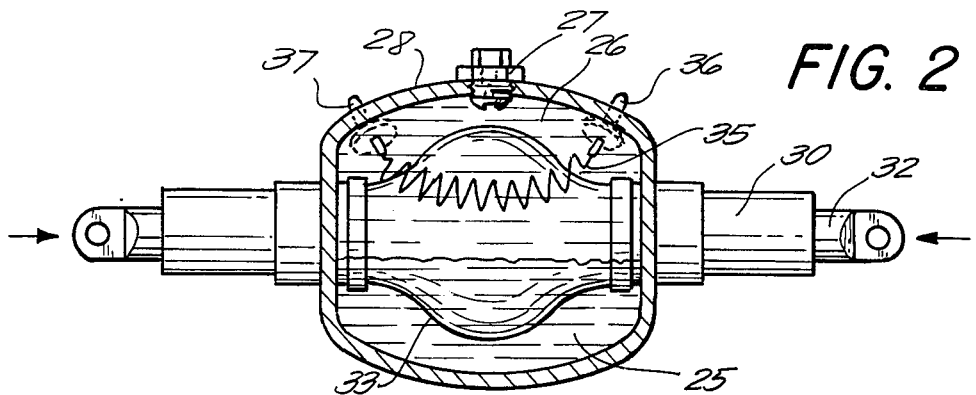
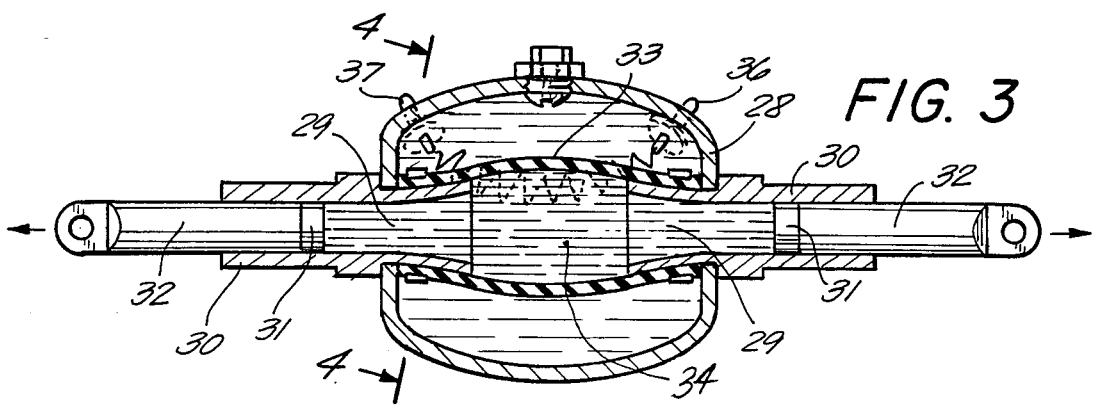
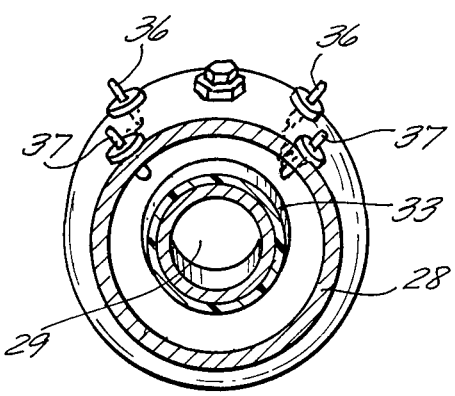
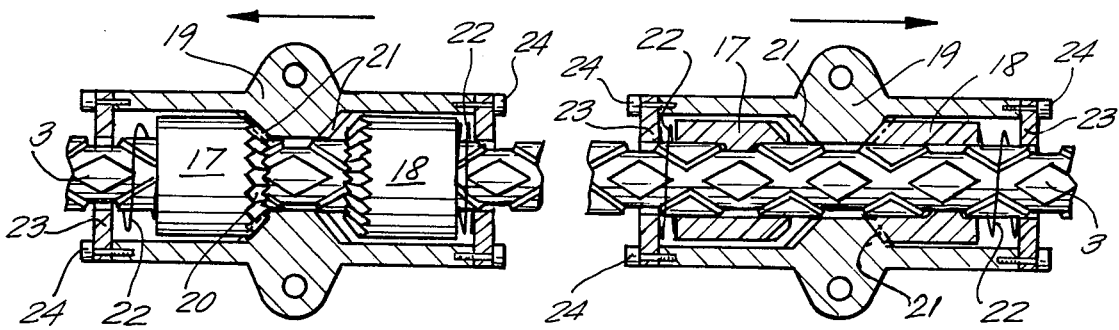

SPINDLE DRIVE WITH EXPANSIBLE CHAMBER MOTORS

The present invention relates to spindle drives with expansible chamber motors.

THE INVENTION

Spindle drive with expansible chamber motors having pistons provides means operating at intervals introduced by an electrically charged resistance wire installed in a reservoir called a pressure cell which is completely filled with two different fluids, for instance, ammonia hydroxide and purified toluene without the presence of any gas bubbles. The ammonia hydroxide is much heavier than toluene and therefore settles to the bottom of the pressure cell so that electrical resistance wire in form of a coil comes only in contact with the tolune, both chemicals don't mix. As soon as electrons are emitted through the resistance wire into the chemical substance, a chemical reaction takes place combined with a thermo heat expansion to expand the fluid inside the pressure cell to move the pistons outward. This will activate a limit switch to cut off electricity from the resistance wire. At that point the ammonia hydroxide inside the pressure cell will absorb energy out of the cell to transmit it into the housing of the motor which now acts as a heat exchanger whereby the fluids inside the motor starts to contract and thereby moves pistons inwards. This process has been carefully studied through experimentation on several models whereby the above mentioned substances have been most effective. The uniqueness of this expansible chamber motor is, that not only the upper cycle but also the lower cycle can do physical work, with the exception that the load applied to the lower cycle cannot surpass atmospheric pressure.

The present design is a mechanical means which can be embodied in almost any design as for example, a surfboard, meaning the mechanism of the present invention can pump water through bellows inside the surfboard to propel the surfboard, as the spindle rotates freely. When taken out of the water, wheels can be mounted to it and activated through the spindle by a pulley and belt, additionally, wings can be mounted to it as the spindle rotates the propeller. Also, one can take this invention into a home for heating purposes since the heat exchanges are sufficient to heat a sizable room.

A feature of this invention is its uniqueness putting the upper and lower cycle to work. Additionally, all parts can be made of very light material, light enough to compete with a bird per lb/h.p. Additionally, the design is like a flat skeleton, therefore, can be installed inside a wing or board furthermore, the machine has no dead center and therefore can operate at any R.P.M. All parts except the spindle move in slow motion which reduces friction and wearouts. Therefore, it can be concealed for the life time of the machine which can outlast a human life time, without service, and above all no noise or any polluting aspects are involved. It can operate underwater, in the atmosphere and in space.

OBJECTS OF THE INVENTION

A principal object of the invention is to provide new and improved engine means.

Another object of the invention is to provide new and improved engine means spindle drive comprising a spindle expansible chamber motors, pawls mounted on the spindle the spindle being connected to be rotated by stroke action of the pawls, the expansible chamber motors being connected to the pawl means to rotate the spindle, the expansible chamber motors containing two different fluids, an electrical resistance wire passing through one of the fluids, a source of electricity connected to the wire, whereby the fluid becomes energized by the electrical resistance wire and thermo expansion inside the motor rotates the spindle.

Further objects of this invention will be pointed out in the following detailed description and claims illustrated in the accompanying drawings which discloses by way of example the principal of this invention and the best mode which has been contemplated of applying that principal.

BRIEF DESCRIPTION OF THE DRAWINGS

FIG. 2 is a schematic vertical sectional view of the expansible chamber motors under contraction.

FIG. 3 is a schematic vertical sectional view of the expansible chamber motors under expansion.

FIG. 4 is a perspective front cross section view of a expansible chamber motors as shown in FIG. 3.

FIG. 5 is a partly sectional explanatory view of the pawl mechanism in a left stroke action.

FIG. 6 is a partly sectional explanatory view of the pawl mechanism in a right stroke action.

DETAILED DESCRIPTION OF A PREFERRED EMBODIMENT

Figure 1:
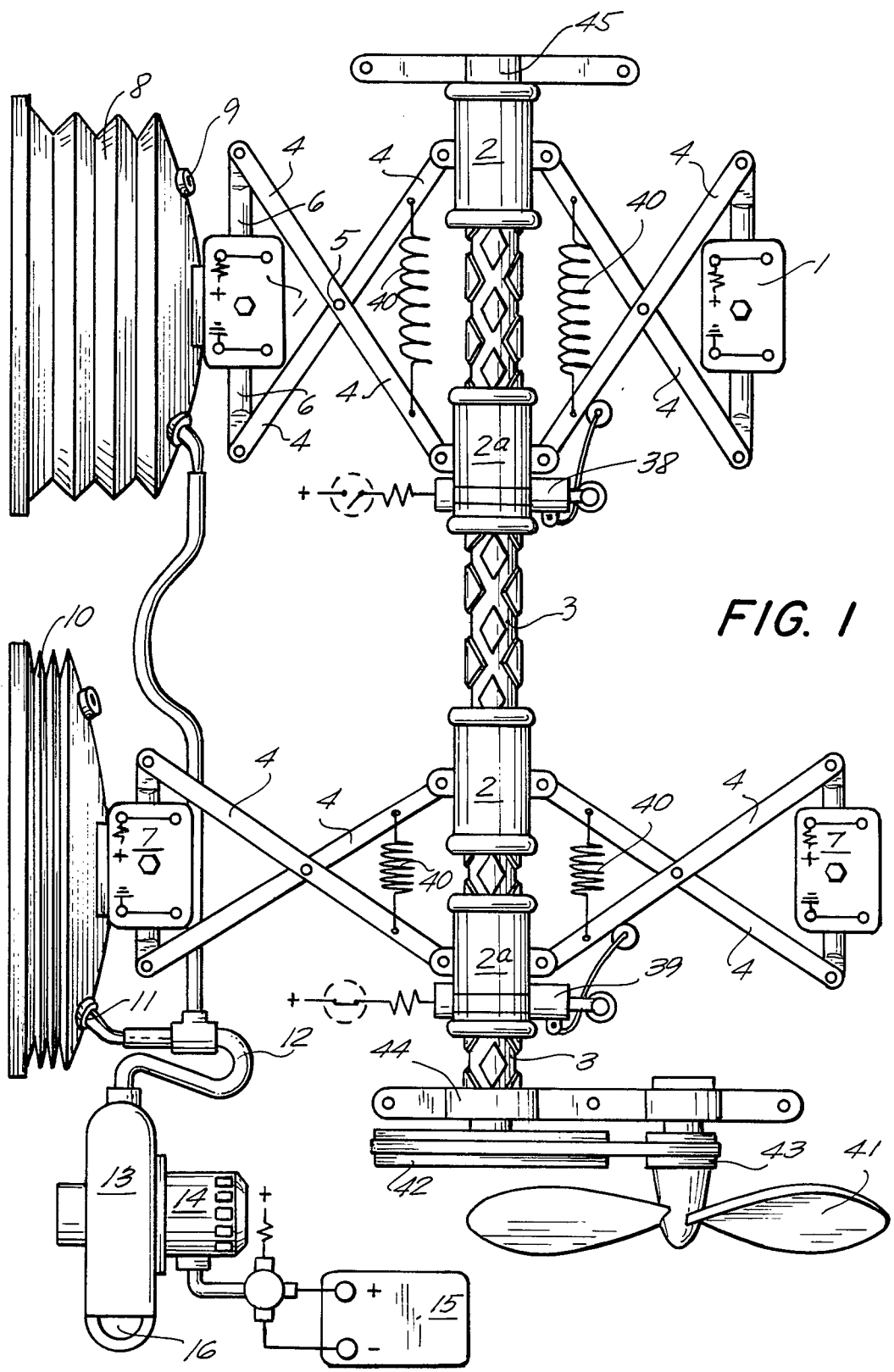
FIG. 1 is an explanatory plan view of a spindle drive with expansible chamber motors.

Referring to the Figures, in FIG. 1, there is shown a spindle drive activated by expansible chamber motors 1. The principle of this machine is to slide several pawls 2, 2a, stroke wise along a spindle 3, to rotate spindle in order to do physical work. The movement of the pawls is achieved through the expansible chamber motors, 1. The expansible chamber motors are installed in between two crossing bars 4, whereby cross section of bars are secured by a pin to achieve shear action by connecting one end of each bar to push rod 6, as the other end of the bar is joined to pawl mechanism 2. Therefore, when both push rods 6 are moved outward, two units pawls 2 and 2a, are moved apart from each other to rotate spindle 3. When the expansible chamber motors contracts as shown on the lower part of FIG. 1, pawl units 2 and 2a are moved against each other at the same expansible chamber motors 7 and 7a, are moved apart from each other. Stroke action of the spindle drive mechanism rotates spindle as stroke action from the expansible chamber motors, activates bellows 8 and 10, mounted to expansible chamber motors 1 and 7. As bellows 8 is moved apart, the surrounding air is sucked through one way inlet valve 9. When bellows 10 is pushed together as shown in FIG. 1, the air inside bellows 10 becomes pressurized thereby air pressure is directed through one-way valve 11, into a flexible hose 12, which directs the pressurized air into air turbine 13, to activate alternator 14, in order to charge battery 15, to supply the electricity needed to activate expansible chamber motors 1 and 7. The air from the turbine 13 exits to outlet 16. In this fashion, the expansible chamber motors does all all the work to rotate spindle and activate bellows 8 and 10 to rotate turbine 13, via alternator 14, to charge battery 15. The battery must be recharged or changed when it is used up. To achieve a continuous rotation in one direct of spindle 3, pawl mechanism 2, consists of two pawls 17 and 18, FIGS. 5 and 6. Each pawl is matched to the spindle track by a track shoe whereby each shoe fits to a spindle track of opposite direction. Two pawls 17, 18, with opposite rotation FIG. 5, are joined in a cylinder 19, which in the center has two opposite stationary ratchet gears 21. When the pawl mechanism of FIG. 5 moves from the right to the left, pawl 17, is intermeshing with stern ratchet gear of pawl 20 and with stern stationary ratchet gear 21, when pawl unit moves from the left to the right as shown in FIG. 6. Then pawl 17, automatically disengages from stationary ratchet gear 21, at the same time pawl 18 is intermeshing with stationary ratchet gear 21. Therefore, a right or left stroke action of pawl bushing cylinder 2, sequentially engaging one pawl as the other disengages and thereby rotates spindle in one direction regardless in which direction pawl bushing cylinder 19 is moved. The pawls are kept in position by spring 22 and plate 23, screwed against pawl cylinder 19 by screw 24.

EXPANSIBLE CHAMBER MOTORS

The expansible chamber motors are the vital part of this machine and come in different designs depending on the energy source activating these motors. The present invention introduces a new design to simplify the operation of the machine and improve the efficiency by using the expansion and contractions of the working fluid to do physical work. This is a new approach in thermodynamics thereby the upper and lower cycle can do the same work by the same force.

The statements herein made are the results of experimentation with a model built exactly as shown in FIGS. 2 and 3. Pressure cell 28, FIG. 2, is filled partly with ammonia hydroxide 25 as the rest of the pressure cell is filled with purified toluene 26. There can be no gas bubbles in between, therefore, a bleeder valve 27 is installed at the highest point of the pressure cell. The pressure cell 28 has tapered openings 29, to connect piston seal 31, and push rod 32, through cylinder 30, with pressure cell 28, both openings 29, extending to the inside of pressure cell 28. In order to join both cylinders into a flexible bladder 33, bladder and pushrod cylinder 30, are filled with a hydraulic oil 34, to lubricate the movement of piston seal and push rod. The advantage of the bladder is that a greater surface is exposed to the working fluid which in return increases stroke action of push rod 32. Additionally, the bladder 33 prevents working fluid from leaking through piston seal 31. To activate the expansible chamber motors electrical resistance wire 35 is joined to two contacts FIG. 2, 36 and 37, on the inside of the motor which penetrates the motor case to the outside in order to make contact. As shown in FIG. 2, 36 and 37, the resistance wire 35, does not come in contact with ammonia hydroxide 25, but with toluene 26, which is an electrical nonconductive substance. FIG. 2 shows the expansible chamber motors in relaxed stage. FIG. 3 shows the expansible chamber motors under expansion. In this position limit switch 38, FIG. 1, will cut off the electricity from the resistance wire, whereby the motor cools off and moves linkage 4, and expansible chamber motor 7 outward. This is the moment the limit switch 39, closes the circuit to supply the electricity needed to activate the expansible chamber motors. The back stroke of the machine is weaker than the outward stroke. Therefore, springs 40, installed in between linkage 4, will assist the back stroke. In order to shorten the cool off period of expansible chamber motors, pulley 42 mounted to spindle 3, will rotate propeller 41, for cooling purpose.

FIG. 4 shows a perspective cross section view of an expansible chamber motor in order to show the opening 29 of bladder 33.

While there have been shown and described and pointed out the fundamental fequres of the invention as applied to a preferred embodiment, it will be understood that various ommissions and substitutions and changes in the form and detail of the device illustrated and in its detail may be made by those skilled in the art without departing from spirit of the invention. It is the intention, therefore, to be limited only as indicated by the scope of the following claims.

What is claimed is:

1. A power system comprising: a shaft which contains at least one spiral groove on the outer surface thereof; a sleeve concentrically mounted on said shaft, a projection emanating from the inner surface of the sleeve and in operative engagement with said groove, such that reciprocation of said sleeve causes rotation of said shaft; an expansible chamber motor consisting of a housing, a first fluid within said housing; and an electrical resistance wire passing through said first fluid whereby upon energization of said wire the first fluid expands within said housing; said motor further consisting of a second fluid housed within a deformable chamber within said housing, wherein said chamber is in fluid communication with said first fluid whereby upon energization of said wire the first fluid expands to displace said deformable chamber and the second fluid contained therein; at least one output element of said motor which reciprocates as a result of the movement of said second fluid within the chamber; a transmission means connecting the output element to said sleeve, whereby said sleeve is reciprocated as a result of the reciprocating movement of the output element and rotary movement of said shaft is obtained.

2. Spindle drive with expansible chamber motor as in claim 1, having a bellows connected to the expansible chamber motor to provide pump action of the bellows.

3. Spindle drive with expansible chamber motor as in claim 1, wherein the expansible chamber motors are filled with two substances with different properties which do not mix with each other.

4. Spindle drive with expansible chamber motor as in claim 3 wherein the fluids in the motor are purified toluene and ammonia hydroxide.

5. Spindle drive with expansible chamber motor as in claim 1 having an electrical heat coil to energize the fluid inside the motor.

6. Spindle drive with expansible chamber motor of claim 5, having two piston cylinders, a flexible bladder connected to the openings of the piston cylinders, a flexible bladder connected to the openings of the piston cylinders inside the expansible chamber motor in order to increase stroke action.

7. Spindle drive with expansible chamber motor as in claim 6 wherein the flexible bladder is filled with a lubricant.

* * * * *